United States Patent [19]
Grove

[11] Patent Number: 5,744,041
[45] Date of Patent: Apr. 28, 1998

[54] BIOLOGICAL TREATMENT PROCESS

[76] Inventor: John E. Grove, 18999 C.R. 306, Buena Vista, Colo. 81211

[21] Appl. No.: 715,923

[22] Filed: Sep. 19, 1996

[51] Int. Cl.$^6$ .............................. C02F 3/30; C02F 3/32
[52] U.S. Cl. .................... 210/602; 210/605; 210/622; 210/630
[58] Field of Search ...................... 210/602, 603, 210/605, 612, 622, 624, 625, 630

[56] References Cited

U.S. PATENT DOCUMENTS

| | | | |
|---|---|---|---|
| 3,711,392 | 1/1973 | Metzger | 210/612 |
| 4,053,394 | 10/1977 | Fisk | 210/605 |
| 4,251,359 | 2/1981 | Colwell et al. | 210/605 |
| 4,267,038 | 5/1981 | Thompson | 210/602 |
| 4,995,980 | 2/1991 | Jaubert | 210/602 |
| 5,645,725 | 7/1997 | Kong et al. | 210/605 |

*Primary Examiner*—Thomas G. Wyse
*Attorney, Agent, or Firm*—Emery L. Tracy

[57] ABSTRACT

A method for the step-wise reduction of biological oxygen demand of a waste material having a high concentration of organic waste is provided. The method comprises the steps of providing waste material having a biological oxygen demand and allowing the waste material to separate into a liquid fraction comprising water and suspended organic waste, and allowing at least a portion of the organic waste to be anaerobically digested by microorganisms naturally occurring in the organic waste. Next, at least a portion of the liquid fraction having a reduced biological oxygen demand in relation to the biological oxygen demand of the waste material is removed and mixed with aerobic microorganisms and an aerating gas and allowing at least a portion of the organic waste in the aerobic mixture to be aerobically digested by the aerobic microorganisms to form a liquor comprising water and suspended solids. The liquor has a reduced biological oxygen demand relative to the biological oxygen demand of the liquid fraction. Then, at least a portion of the suspended solids in the liquor is allowed to settle, forming a clarified liquor having a reduced biological oxygen demand relative to the biological oxygen demand of the liquor. The clarified liquor is subjected to microzone treatment to remove at least a portion of the aerobic microorganisms from the clarified liquor to form a permeate having a reduced biological oxygen demand relative to the clarified liquid. Finally, at least a portion of the permeate is discharged or reused.

27 Claims, 1 Drawing Sheet

BIOLOGICAL TREATMENT PROCESS

BACKGROUND OF THE INVENTION

1. Field of the Invention

This invention relates generally to a biological treatment process for the biological treatment of organic waste material and, more particularly, it relates to a biological treatment process which utilizes a combined anaerobic, facultative and aerobic biological treatment of organic waste material.

2. Description of the Prior Art

The treatment of high-strength, aerobic/anaerobic organic wastes solutions, particularly wastes having widely variable total solids, i.e., 2,000 mg/l to 150,000 mg/l total solids, and nutrient loads has become increasingly challenging in many regions throughout the world. The difficulties in treating such wastes are magnified in some locations, particularly in non-industrialized nations and rural areas that cannot be economically served by conventional modern waste collection and treatment facilities. Moreover, many rural municipal and publicly owned waste treatment facilities are unable to accept such waste because the treatment processes are not designed to effectively separate and treat anaerobic organic wastes that have widely fluctuating physical and chemical characteristics.

Known methods and apparatus for treating organic waste material such as septic tank waste (septage), feed lot wastes and food processing facility wastes have several drawbacks. Traditionally, such high strength organic waste treatment processes initially involve a mechanical solid/liquid separation stage, i.e., belt press, etc. Typically, such approaches remove a substantial portion of the solids which are then dried to cake and composted, incorporated into soil, combusted or discarded to landfills, as dictated by representative sampling. The remaining liquid is then treated separately, stored and tested before being discharged, or sent to an appropriate waste treatment or internment facility. The separate treatment of the solids and liquid wastes thus often involves considerable additional testing, handling and management costs. These costs are further compounded by the large volumes and variable solids loads of such organic wastes. As a result, conventional treatment facilities are expensive to capitalize, difficult and often unpleasant to operate and aesthetically unacceptable in surrounding environments.

Most conventional liquid waste treatment processes utilize time and energy intensive chemical and biological systems in order to render the organic waste suitable for discharge. Such processes, however, are an expensive way to treat wastes due to the quantity of staff time, electrical energy and chemical reagents which must be used in order to effectively respond to and treat massive variations in volume and pollutant loads. Moreover, chemical and/or mechanical treatment of wastes can result in deleterious impacts on the environment as such system are especially vulnerable to upset and failure, known as "shocking" when subjected to intense loading. The chemical treatment of wastes also necessitates additional risks implicit in the manufacture and storage of treatment and disinfection chemicals.

Yet further, biological or "bioremediation" processes have been proposed for treating organic wastes, which include both exclusively biological and hybrid chemical/biological waste treatment methods. Hybrid waste treatment processes have many of the environmental and monetary cost drawbacks of mechanical and chemical treatment processes. Many of the proposed biological bioremediation processes also utilize physical and mechanical solids separation and prohibitive residence times in the waste treatment facility for the waste being treated in order to obtain water suitable for discharge to the environment or to a municipal waste treatment facility for polishing. In addition, many purely biological bioremediation processes rely primarily on the use of enzymes and bacteria naturally occurring in the waste in order to perform the bioremediation of the waste, and are inherently less reliable due to the fluctuation in microbial populations in waste samples and waste types. Further, such processes may stimulate the growth of pathogenic organisms as well as beneficial organisms. Moreover, several known biological waste treatment methods utilize environmental conditions (e.g., ambient pH, temperature, sunlight to maintain the growth rate of the microorganisms) used and can be undesirably affected by changes in such environmental conditions.

As a result of the shortcomings of known waste treatment processes, there is a need to provide a reliable waste treatment process for treating liquid organic wastes which is environmentally safe, cost effective, and aesthetically acceptable.

It is an object of the present invention to provide a waste treatment process for treating organic waste which does not require mechanically intensive separation and treatment of the solid and liquid portions of such waste.

It is another object of the present invention to provide a waste treatment process for treating organic waste which does not require the addition of flocculation agents or other chemicals in order to render the waste suitable for discharge to the environment.

It is yet a further object of the present invention to provide a waste treatment process for treating organic waste which provides for the safe, reliable and aesthetically acceptable treatment of organic wastes by biological means.

It is even a further object of the present invention to provide a waste treatment process for treating organic waste which provides treated water which has the quality to be reused for agricultural, commercial, or for discharge to surface water such as in streams, lakes, or ponds or for raw water supply.

SUMMARY OF THE INVENTION

The present invention is a method for the step-wise reduction of biological oxygen demand of a waste material having a high concentration of organic waste. The method comprises the steps of, first, providing waste material having a biological oxygen demand and allowing the waste material to separate into a liquid fraction comprising water and suspended organic waste, and allowing at least a portion of the organic waste to be anaerobically digested by microorganisms naturally occurring in the organic waste. Next, at least a portion of the liquid fraction having a reduced biological oxygen demand in relation to the biological oxygen demand of the waste material is removed and mixed with aerobic microorganisms and an aerating gas and allowing at least a portion of the organic waste in the aerobic mixture to be aerobically digested by the aerobic microorganisms to form a liquor comprising water and suspended solids. The liquor has a reduced biological oxygen demand relative to the biological oxygen demand of the liquid fraction. Then, at least a portion of the suspended solids in the liquor are allowed to settle, forming a clarified liquor having a reduced biological oxygen demand relative to the biological oxygen demand of the liquor. The clarified liquor is then subjected to microzone treatment to remove at least a portion of the aerobic microorganisms from the clarified liquor to form a permeate having a reduced biological oxygen demand relative to the clarified liquid. Finally, at least a portion of the permeate is discharged.

In an embodiment of the biological treatment process of the present invention, the method further comprises adding anaerobic microorganisms to the waste material to obtain a concentration of the microorganisms in the range of from about 1 wt % to about 25 wt % of the waste material. Also, in an embodiment of the biological treatment process of the present invention, the method further comprises collecting gas produced by the anaerobic digestion.

In another embodiment of the biological treatment process of the present invention, the aerobic microorganisms comprise algae and, further, the algae comprise green algae of the genus Chlorella. In yet another embodiment of the biological treatment process of the present invention, the aerating gas is air and, further, the aerating gas comprises a volume fraction of oxygen greater than the volume fraction of oxygen in ambient air.

In an embodiment of the biological treatment process of the present invention, the method further comprises maintaining the temperature of the aerobic mixture within the range of from about 40° F. to about 110° F. for enhancing the growth rate of the aerobic microorganisms. In still another embodiment of the biological treatment process of the present invention, the temperature of the aerobic mixture can be maintained by controlling the temperature of the aerating gas. Furthermore, preferably, the aerating gas is sparged into the aerobic mixture.

In an embodiment of the biological treatment process of the present invention, the method further comprises adding aerobic microorganisms to the liquor. Furthermore, in yet another embodiment of the biological treatment process of the present invention, the method further comprises adding aerobic microorganisms to the clarified liquor.

In an embodiment of the biological treatment process of the present invention, the biological oxygen demand of the liquid fraction is less than about 70% of the biological oxygen demand of the waste material. Furthermore, the biological demand of the liquor is less than about 40% of the biological oxygen demand of the waste material. Also, the biological oxygen demand of the clarified liquid is less than about 30% of the biological oxygen demand of the waste material. In another embodiment, the biological oxygen demand of the permeate is less than about 50% of the biological oxygen demand of the clarified liquor.

The present invention is also a method for treating waste material having a high concentration of organic waste to reduce the biological oxygen demand of the waste material. The method comprises providing waste material and allowing the waste material to separate into a liquid fraction comprising water and suspended organic waste, and a solids fraction comprising precipitated organic waste, and allowing at least a portion of the organic waste to be anaerobically digested by microorganisms naturally occurring in the organic waste. Next, at least a portion of the liquid fraction is removed and mixed with aerobic microorganisms and an aerating gas while maintaining the temperature of the resulting aerobic mixture within a temperature range in which the aerobic microorganisms can aerobically digest organic waste in the aerobic mixture and allowing at least a portion of the organic waste in the aerobic mixture to aerobically digested by the aerobic microorganisms to form a liquor comprising water and aerobic microorganisms. Then, the liquor is subjected to microzone treatment to remove at least a portion of the aerobic microorganism from the liquor to form a permeate. Finally, the permeate is discharged.

In an embodiment of the biological treatment process of the present invention, the method further comprises allowing suspended solid matter in the liquor to settle prior to subjecting the liquor to microzone treatment. In another embodiment of the biological treatment process of the present invention, the method further comprises adding anaerobic microorganisms to the waste material to obtain a concentration of the microorganisms in the range of from about 1 wt % to about 25 wt % of the waste material. In yet another embodiment of the biological treatment process of the present invention, the method further comprises collecting gas produced by the anaerobic digestion.

In an embodiment of the biological treatment process of the present invention, the anaerobic microorganisms comprise algae and, preferably, green algae of the genus Chlorella. Furthermore, in an embodiment of the biological treatment process of the present invention, the amount of the organisms added to the liquid fraction is within the range of from about 30 mg/l to about 200 mg/l and the aerobic mixture comprises greater than about 20% by volume aerobic microorganisms. In addition, in an embodiment of the biological treatment process of the present invention, the aerobic mixture comprises greater than about 20% by volume aerobic microorganisms.

In still another embodiment of the biological treatment process of the present invention, the aerating gas is air and the aerating gas comprises a volume fraction of oxygen greater than the volume fraction of oxygen in ambient air. Furthermore, the temperature of the aerobic mixture can be maintained by controlling the temperature of the aerating gas and the aerating gas is sparged into the aerobic mixture.

In yet another embodiment of the biological treatment process of the present invention, the organic waste is anaerobically digested for less than about 7 days, preferably, less than about 12 hours. In addition, in an embodiment of the biological treatment process of the present invention, the liquor is subjected to microzone treatment for less than about 7 days and the suspended solid matter in the liquor is allowed to settle for less than about 20 hours.

DETAILED DESCRIPTION OF THE PREFERRED EMBODIMENTS

Figure 1:
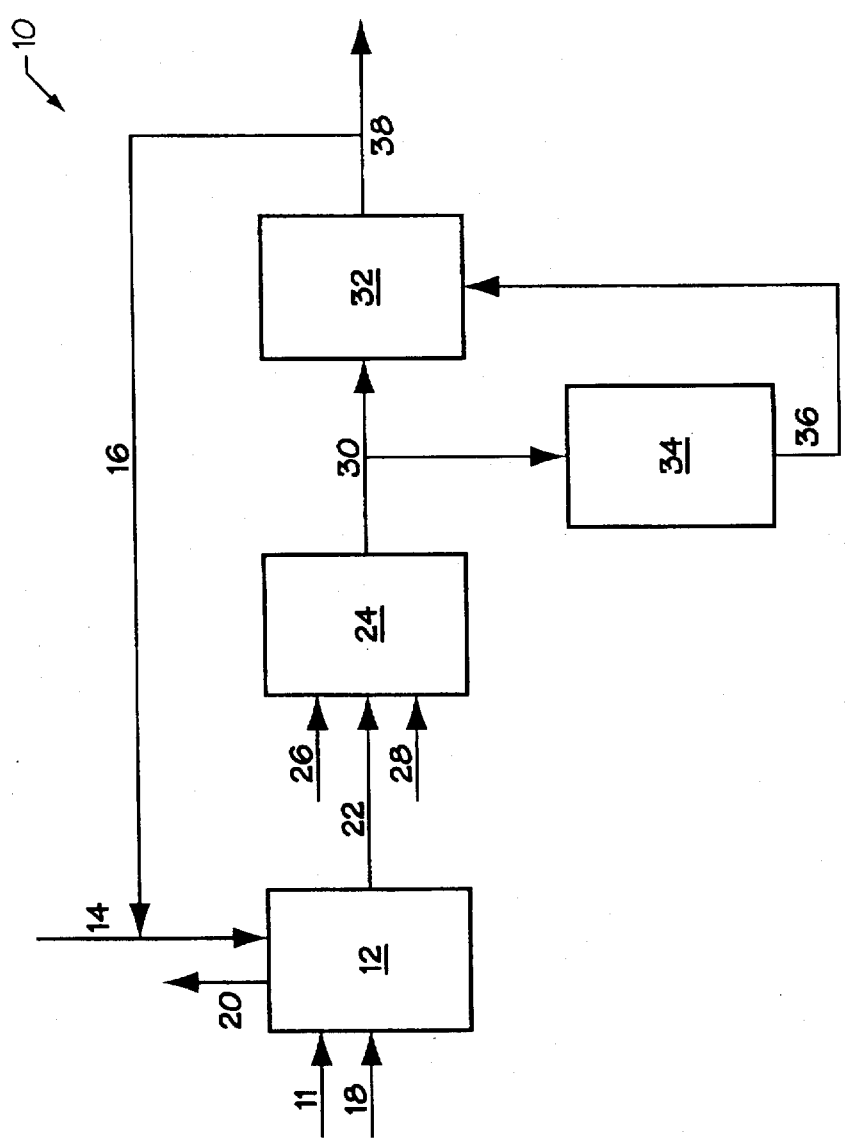
FIG. 1 is a flow diagram of an embodiment of the biological treatment process according to the present invention.

The present invention is a biological treatment process directed to the biological treatment of organic wastes. The present invention includes a novel, integrated waste treatment system of an anaerobic digestion step, followed by at least one aerobic digestion stage, and a further combined anaerobic, facultative and aerobic microzone treatment step as will be described in further detail below. In the operation of the present invention, it is important that the aerobic digestion stage(s) follow, rather than precede the anaerobic digestion step. As a result, a more fully anaerobic environment can be achieved in the initial start-up of the biological treatment process, anaerobic microorganisms in the organic waste can be used to digest the organic waste, and the anaerobic microorganisms tend to be more prolific in methane production during digestion.

More particularly, in one embodiment of the biological treatment process of the present invention, raw waste material containing organic waste is provided to an in-pond anaerobic digester containing anaerobic microorganisms capable of digesting the organic waste and reducing the biological oxygen demand of the organic waste. The raw waste material in the anaerobic digester is allowed to gravimetrically settle, resulting in the formation of at least two fractions, a solids enriched fraction and a solids depleted or liquid fraction. While contained in the anaerobic digester, at least a portion of the organic waste is digested by the anaerobic microorganisms, reducing the overall solids content of the raw waste material. Accordingly, little to no sludge accumulates in the biological treatment process of the present invention which must be separately treated.

In one embodiment of the biological treatment process of the present invention, the anaerobic digester is an integrated pond, such as an ADVANCED INTEGRATED POND® by Oswald Green, Concord, Calif., containing stratified layers of varying microbial activity and provides thermal and convective isolation of the solids fraction thereby passively maintaining pH and temperature of the solids fraction promoting efficient anaerobic digestion. The upper layers of such an integrated pond design are typically oxygen-enriched and digestion of the liquid portion of the raw waste material can be further enhanced with the addition of cultured aerobic populations as described below in relation to the following aerobic digestion step.

At least a portion of the liquid fraction which is formed in the anaerobic digester, which has a reduced biological oxygen demand relative to the biological oxygen demand of the raw waste material is then decanted from the primary, anaerobic digester and provided to a second, aerobic digestion process. The aerobic digestion process preferably includes providing the liquid fraction to one or more aerobic digesters. The aerobic digestion process can be carried out in both batch and continuous modes, however, batch mode operation is preferred such as by withdrawing selected aliquots of the liquid fraction from the anaerobic digester.

In the aerobic digesters, the liquid fraction is mixed with aerobic microorganisms or exudates and an aerating gas to allow the aerobic microorganisms to digest at least a portion of the organic wastes in the liquid fraction thereby reducing the biological oxygen demand of the aerobic mixture. In a preferred embodiment of the of the biological treatment process of the present invention, the temperature and the composition of the aerating gas can be controlled to maintain an environment which is better suited to the growth of the aerobic microorganisms. Controlling the aerating gas effectively prevents further anaerobic digestion of the liquid fraction. Preferably, the aerating gas provided to the aerobic digesters is introduced in a manner which provides a gentle rolling and mixing action in the aerobic digester in order to increase both the growth rate of the aerobic microorganisms and their contact with the waste to be remediated, obviating the need for mechanical mining of the contents of the aerobic digesters. An important feature of the present invention is the stimulation of growth of the desired aerobic microorganisms added to the liquid fraction by the addition of an aerating gas, which inhibit the growth of undesirable obligate anaerobes. Further, oxygen added to the waste in the digester in the aerating gas helps to reduce the biological oxygen demand thereof by chemically oxidizing the waste.

After sufficient residence time to obtain a further reduction in the biological oxygen demand of the aerobic mixture relative to the biological oxygen demand of the raw waste material, the contents of each aerobic digester are then provided to a microzone treatment cell, which is designed to allow at least a portion of any remaining organic waste in the treated liquor to be digested through localized microzone treatment cells of aerobic, facultative and anaerobic digestion. The Grove et al, U.S. patent application Ser. No. 08/688,851, filed Jul. 31, 1996, describes a microzone treatment cell which is suitable for use with the present invention and is hereby herein incorporated by reference.

Microzone treatment cell digestion can be carried out by microorganisms present in the waste, and can also be enhanced or assisted by inoculation of the treatment cell with appropriate microorganisms. Further, during microzone treatment of the waste, microorganisms present in the waste can be removed from the waste as it is treated such that the resulting permeate from the microzone treatment cell is of sufficient quality to be discharged to the environment. Accordingly, the biological oxygen demand of the permeate is yet further reduced relative to the biological oxygen demand of the raw waste material.

In a preferred embodiment of the present invention, an intermediate step is included in the waste treatment method previously described, in which suspended solids in the treated liquor from the aerobic digester are allowed to settle, such as in a stilling basin or meander tank, from the treated liquor. This intermediate step forms a clarified liquor having a reduced biological oxygen demand relative to the biological oxygen demand of the treated liquor and the raw waste material. This clarified liquor can then be provided to the microzone treatment cell as previously described.

The waste treatment process, indicated generally at 10, of the present invention for the treatment of organic waste will now be described in yet further detail in relation to FIG. 1. FIG. 1 is a flow diagram of an embodiment of the waste treatment process 10 of the present invention. As illustrated in FIG. 1, raw waste material or septage 11 obtained from various sources is brought, such as through the use of tanker cars and/or trucks, to a waste treatment facility according to the present invention and conducted to a primary settling basin and in-pond anaerobic digestion tank 12. In consistently warmer climates, the anaerobic digestion tank 12 can be an open-air or, preferably enclosed cement, ceramic or steel vessel, or other suitable structure or containment vessel.

When first brought to the waste treatment facility, the raw waste material 11 can be tested in order to determine whether the raw waste material 11 contents are within the constraints for treatment by the methods of the present invention, that is, the raw waste material 11 is tested to determine whether it contains a substantial portion of non-treatable wastes, which include, but are not limited to, toxic wastes, heavy metals, radioactive wastes, pesticides, oils, hydrocarbons, grease, inorganic and inert solids, such as plastics, biostatic or biocidal compounds, such as fungicides, and other sterilizing agents and highly alkaline or acidic solutions. Typically, the raw waste material 11 should not contain greater than about 15 wt % non-treatable wastes, preferably less than about 5 wt % non-treatable wastes, and more preferably less than about 3 wt % non-treatable wastes.

The raw waste material 11 can also be comminuted prior to being placed in the anaerobic digestion tank 12 in order to reduce the particle size of the raw waste material 11, and to further enhance digestion of the waste by increasing the surface area of the waste available to microorganisms. Subsequent to comminuting, the raw waste material 11 can also be screened, such as through the use of about a 2" mesh screen, or smaller, in order to remove larger non-digestible material (e.g., metal objects, plastics, etc.) which may be present in the raw waste material 11. Optionally, or in addition to screening, the raw waste material 11 can be subjected to magnetic fields in order to remove various ferrous metal objects that may be present in the raw waste material 11. Further, while not required, the raw waste material 11 can be diluted with water 14 or previously treated waste material 16 in order to dilute and reduce the solids or pollutant loading thereof.

After being placed in the anaerobic digester 12, organic waste in the raw waste material 11 is anaerobically digested by anaerobic microorganisms naturally occurring in the raw waste material 11, and is allowed to separate into a solids fraction and a liquid fraction. Optionally, the raw waste material 11 can be mixed with selected anaerobic microorganisms 18 in order to enhance the anaerobic digestion of the organic raw waste material 11, for example to decrease the required residence time of the raw waste material 11 in the anaerobic digester 12.

Microorganisms that typically occur naturally in the organic raw waste material 11 include filamentous single cell bacterial species with the capability of anaerobic respiration. Many of these organisms are suitable for anaerobically digesting the organic raw waste material 11, including, for example, methanogenous bacteria. These anaerobic microorganisms 18 are also suitable for adding to the raw waste material 11. Such anaerobic microorganisms 18 can be added to the raw waste material 11 to obtain a total starting concentration range of from about 1 wt % to about 25 wt %.

In a preferred embodiment of the waste treatment process 10 of the present invention, byproducts produced during anaerobic digestion 20, such as, for example, methane gas, can be collected for re-use or resale. In such cases, the anaerobic digestion 20 typically occurs in an isolated containment vessel (not shown), which also helps to reduce the amount of odor generated by the waste treatment process according to the present invention.

The residence times for the raw waste material 11 to be treated in the anaerobic digester 12 depends upon the ability of the anaerobic microorganisms to metabolize the organic wastes within the raw waste material 11, and the gravimetric formation of the liquid fraction. Preferably, in the stratified environment of the anaerobic digester 12, such as an ADVANCE INTEGRATED POND® by Oswald Green, Concord, Calif., an oxygen rich layer is created by the growth of oxygen producing algae in the liquid fraction. The biological oxygen demand of the liquid fraction is at least periodically monitored, and when the biological oxygen demand of this preferably facultative and/or aerobic mixture is less than about 75% of the biological oxygen demand of the raw waste material 11, a portion of the liquid fraction 22 obtained from the anaerobic digester 12, such as an aliquot of liquid drawn from the stratified upper layers of the primary in-pond anaerobic digester 12, is provided to an aerobic digester stage 24, comprising, for example, one or more open-air or preferably, closed cent, ceramic, steel, plastic or other suitable containment vessels. Because of the stratified layering of the primary in-pond anaerobic digester 12, it is possible to selectively draw a liquid fraction within a range of biological oxygen demand strengths. Accordingly, the liquid fraction 22 typically exhibits a biological oxygen demand less than about 70% of the biological oxygen demand of the raw waste material 11, preferably a biological oxygen demand less than about 60% of the biological oxygen demand of the raw waste material 11, and more preferably a biological oxygen demand less than about 50% of the biological oxygen demand less than about 50% of the biological oxygen demand of the raw waste material 11.

These reductions in biological oxygen demand typically correspond to residence times for the raw waste material 11 in the anaerobic digester 12 of less than about 12 days, preferably less than about 7 days, and more preferably less than about 3 days.

The liquid fraction 22 provided to one or more aerobic digesters 24 can be combined with aerobic microorganisms 26, and the resulting aerobic mixture can be gently mixed preferably through the introduction of an aerating gas 28 into the aerobic digester 24. In a preferred embodiment, the aerating gas 28 is air, however, it has been found that aerobic digestion of the organic wastes in the liquid fraction can be further enhanced by aerating the aerobic mixture with an aerating gas having a volume fraction of oxygen greater than the volume fraction of oxygen in ambient air. The aerating gas 28 can be introduced into the aerobic digester 24 through the use of known apparatus, such as through a sparging tube or with the use of a fill/draw mixed media batch reactor. It has been found, however, that it is particularly advantageous to introduce the aerating gas 28 to the aerobic mixture in the aerobic digester 24 in a manner which allows control of the mean average diameter of the aerating gas bubbles to obtain a gentle "rolling" action. While not intending to be bound by theory, introduction of the aerating gas 28 in such manner makes the oxygen in the aerating gas 28 more available to the microorganisms present and also enhances chemical oxidation of the raw waste material 11.

If the waste treatment facililty is located in a climate which temperatures can adversely impact the effectiveness of the microorganisms, it is preferred that the aerobic digester 24 contain apparatus for maintaining the temperature of the aerobic mixture at a temperature which enhances the growth of the aerobic microorganisms. Typically, the temperature is maintained within the range of from about 40° F. to about 110° F., preferably within the range of from about 60° F. to about 70° F., and more preferably within the range of from about 65° F. to about 69° F. While the temperature can be maintained through the use of internal or external heating elements or other means, it is preferred that the temperature of the aerobic mixture within the aerobic digester 24 be maintained by controlling the temperature of the aerating gas 28.

As previously stated, the aerobic digester 24 can be an open-air vessel. In a preferred embodiment of the present invention, in order to control odors, and to enhance the oxygen content of the aerobic mixture, the aerobic digester 24 is a closed vessel which allows for the provision of a slightly increase pressure in the aerobic digester 24 relative to the ambient atmospheric pressure. In addition, in order to enhance digestion of the organic wastes in the aerobic mixture, particularly when the aerobic microorganisms are phototropic, the aerobic digester 24 can be designed to allow the aerobic mixture to be irradiated with light on a continuous or intermittent basis.

Aerobic microorganisms 26 which are suitable for adding to the liquid fraction 22 include microorganisms selected from photosynthetic and phototropic organisms. Aerobic microorganisms 26 preferred for addition to the liquid fraction 22, include algae selected from the group consisting of the green algae and mixtures thereof. Yet more preferred aerobic microorganisms 26 for addition to the liquid fraction 22 include those of the genus Chlorella. Such aerobic microorganisms 26 can be added to the liquid fraction 22 in a concentration range of from about 30 mg/l to about 200 mg/l, preferably in a concentration range of from about 50 mg/l to about 200 mg/l, a ND more preferably in a concentration range of from about 90 mg/l to about 200 mg/l. Of importance in the present invention is the addition of the aerobic microorganisms 26 in a quantity sufficient to rapidly and efficiently metabolize the organic waste, and to competitively inhibit the growth of pathogenic organisms. In order to accomplish this, the added aerobic microorganisms 26 can make up a volume fraction of greater than about 10% of the aerobic mixture in he aerobic digester 24, preferably greater than about 20% of the aerobic mixture in the aerobic digester 24, and more preferably greater than about 35% of the aerobic mixture in the aerobic digester 24.

The residence times for the liquid fraction 22 of the raw waste material 11 to be treated in the aerobic digester 24 depends upon the nature of the waste material, and the ability of the added aerobic microorganisms 26 to metabolize the organic wastes present in the liquid fraction 22. Preferably, the biological oxygen demand of the aerobic mixture in the aerobic digester 24 is at least periodically monitored, and when the biological oxygen demand of the aerobic mixture is less than about 50% of the biological oxygen demand of the raw waste material 11, the treated liquor 30 can be conducted to the microzone treatment cell 32. Typically, however, the liquid fraction 30 obtained from the aerobic digester 24 is considerably further reduced in biological demand relative to the biological oxygen demand of the raw waste material 11. Accordingly, the liquid fraction 30 typically exhibits a biological oxygen demand less than about 40% of the biological oxygen demand of the raw waste material 11, preferably a biological oxygen demand less than about 30% of the biological oxygen demand of the raw waste material 11, and more preferably a biological oxygen demand less than about 20% of the biological oxygen demand of the raw waste material 11. These reductions in biological oxygen demand typically correspond to residence times for the liquid fraction 22 in the aerobic digester 24 of less than about 7 days, preferably less than about 1 day, and more preferably less than about 12 hours.

The treated liquor 30 obtained from the aerobic digester 24, which contains aerobic microorganisms, can in a preferred embodiment of the present invention, be provided to a quiescent meander cell 34 to allow at least some of the remaining suspended solids in the treated liquor 30 to settle, and further, to allow at least some of the microorganisms to settle out of the treated liquor 30 to form a clarified liquor 36, which can the be conducted to the microzone treatment cell 32. The quiescent meander cell 34 can be an open-air or preferably enclosed cement, ceramic, plastic, steel, or other suitable containment vessel. In one embodiment, the quiescent meander cell 34 comprises a series of shallow channels in which a flow of the treated liquor 30 is induced, for example, by gravity. The flow and residence time of the treated liquor 30 can also be controlled by the use of valves or gates or the like.

The residence times for the treated liquor 30 to be treated in the quiescent meander cell 34 depends upon the ability of the remaining microorganisms in the treated liquor 30 or which have been optionally added to the quiescent meander cell 34 to metabolize the organic wastes and/or associated compounds, the flow requirements (total waste loading) of the waste treatment system, the volume of both the cell and internal meander configuration of the quiescent meander cell 34, and the speed (rate) with which the microorganisms and suspended solids in the treated liquor 30 settle. Typically, however, the residence time for the treated liquor 30 in the quiescent meander cell 34 is less than about 7 days, preferably less than about 1 day (24 hours), and more preferably less than about 20 hours. The clarified liquor 36 obtained from the quiescent meander cell 34 is further reduced in biological oxygen demand relative to the biological oxygen demand of the raw waste material 11. Accordingly, the clarified liquor 36 typically exhibits a biological oxygen demand less than about 30% of the biological oxygen demand of the raw waste material 11, preferably a biological oxygen demand less than about 20% of the biological oxygen demand of the raw waste material 11, and more preferably a biological oxygen demand less than about 10% of the biological oxygen demand of the raw waste material 11.

The phrase "microzone treatment cell", as used herein, refers to a constructed wetland cell which provides an environment comprising microzones of aerobic, facultative and anaerobic activity. The term "microzone", as used herein, refers to localized microzones of aerobic, facultative and/or anaerobic digestion. The size of such microzones are typically within the range of from about 10 microns to about 5 cm, and preferably within the range of from about 10 microns to about 1 cm, and are typically associated with the rhizosphere/root system of planted vegetation in the microzone treatment cell when such is utilized.

The organic waste in the treated liquor 30 and/or the clarified liquor 36 which is provided to the microzone treatment cell 32 is further anaerobically, facultatively and/or aerobically digested by microorganisms remaining in the treated liquor 30 (and/or the clarified liquor 36) or present in the microzone treatment cell 24, or which have optionally been added 30 to the microzone treatment cell 32. The microzone treatment cell 32 also provides the advantage that microorganisms present in the treated liquor 30 (and/or the clarified liquor 36) are largely removed from the treated liquor 30 (and/or the clarified liquor 36) to form a permeate 38, which can then be discharged to the environment or conducted back into one or more stages in the waste treatment system 10 of the present invention, such as previously treated waste material 16 in order to modify the solids loading of the anaerobic digester 12, as previously described.

The residence times for the treated liquor 30 (and/or the clarified liquor 36) to be treated in the microzone treatment cell 32 depends upon the ability of the microorganisms present to metabolize any remaining wastes. Preferably, the biological demand of the aerobic mixture is at least periodically monitored, and when the biological oxygen demand of the aerobic mixture is less than about 10% of the biological oxygen demand of the raw waste material 11, or alternatively less than about 90% of the biological oxygen demand of the treated liquor 30 (and/or the clarified liquor 36), the permeate 38 can be discharged (i.e., ground discharge or water discharge). The amount and biological oxygen demand levels of permeate 38 discharged is dictated by where the permeate 38 is discharged. Biological oxygen demand ranges of up to about 30 mg/l are typically allowed by the EPA for surface discharge. Typically, however, the permeate 38 obtained from the microzone treatment cell 32 is considerably further reduced in biological oxygen demand relative to the biological oxygen demand of the raw waste material 11. Accordingly, the permeate 38 typically exhibits a biological oxygen demand of less than about 5% of the biological oxygen demand of the raw waste material 11, preferably a biological oxygen demand less than about 1% of the biological oxygen demand of the raw waste material 11, and more preferably a biological oxygen demand less than about 0.5% of the biological oxygen demand of the raw waste material 11. Alternatively, the permeate 11 typically exhibits a biological oxygen demand less than about 50% of the biological oxygen demand of the treated liquor 30 and/or the clarified liquor 36, preferably a biological oxygen demand less than about 40% of the biological oxygen demand of the treated liquor 30 and/or the clarified liquor 36, and more preferably a biological oxygen demand of the treated liquor and/or the clarified liquor 36. These reductions in biological oxygen demand typically correspond to residence times for the permeate 38 in the microzone treatment cell 32 of less than about 14 days in colder climates, preferably less than about 10 days, and preferably less than about 3 days in warmer regions. Preferably, the permeate 38 also meets current EPA specifications for groundwater discharge, and contains less than about 10 ppm nitrate nitrogen loading.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A method for the step-wise reduction of biological oxygen demand of a waste material having a high concentration of organic waste, the method comprising the steps of:
   providing waste material having a biological oxygen demand and allowing the waste material to separate into a liquid fraction comprising water and suspended organic waste, and allowing at least a portion of the organic waste to be anaerobically digested by microorganisms naturally occurring in the organic waste;
   removing at least a portion of the liquid fraction having a reduced biological oxygen demand in relation to the biological oxygen demand of the waste material, and mixing the liquid fraction with aerobic microorganisms and an aerating gas and allowing at least a portion of the organic waste in the aerobic mixture to be aerobically digested by the aerobic microorganisms to form a liquor comprising water and suspended solids, the liquor having a reduced biological oxygen demand relative to the biological oxygen demand of the liquid fraction;
   allowing at least a portion of the suspended solids in the liquor to settle, forming a clarified liquor having a reduced biological oxygen demand relative to the biological oxygen demand of the liquor;
   subjecting the clarified liquor to microzone treatment to remove at least a portion of the aerobic microorganisms from the clarified liquor to form a permeate having a reduced biological oxygen demand relative to the clarified liquid; and
   discharging or reusing at least a portion of the permeate.

2. The method of claim 1 and further comprising adding anaerobic microorganisms to the waste material to obtain a concentration of the microorganisms in the range of from about 1 wt % to about 25 wt % of the waste material.

3. The method of claim 1 and further comprising collecting gas produced by the anaerobic digestion.

4. The method of claim 1 wherein the aerobic microorganisms comprise green algae of the genus Chlorella.

5. The method of claim 1 wherein the aerating gas is air, the air comprising a volume fraction of oxygen greater than the volume fraction of oxygen in ambient air.

6. The method of claim 1 and further comprising maintaining the temperature of the aerobic mixture within the range of from about 40° F. to about 110° F. for enhancing the growth rate of the aerobic microorganisms, the temperature maintained by controlling the temperature of the aerating gas.

7. The method of claim 1 wherein the aerating gas is introduced into the aerobic mixture by sparging or by fill/draw mixed media batch reactor.

8. The method of claim 1 and further comprising adding aerobic microorganisms to the liquor.

9. The method of claim 1 and further comprising adding aerobic microorganisms or exudates to the clarified liquor.

10. The method of claim 1 wherein the microzone treatment comprises microzones of aerobic, facultative and anaerobic activity.

11. The method of claim 1 wherein the biological oxygen demand of the liquid fraction is less than about 70% of the biological oxygen demand of the waste material, the biological demand of the liquor is less than about 40% of the biological oxygen demand of the waste material, the biological oxygen demand of the clarified liquid is less than about 30% of the biological oxygen demand of the waste material, and the biological oxygen demand of the permeate is less than about 50% of the biological oxygen demand of the clarified liquor.

12. The method of claim 1 wherein the biological demand of the permeate is less than about 10% of the biological oxygen demand of the waste material.

13. A method for treating waste material having a high concentration of organic waste to reduce the biological oxygen demand of the waste material, the method comprising:
   providing waste material and allowing the waste material to separate into a liquid fraction comprising water and suspended organic waste, and a solids fraction comprising precipitated organic waste, and allowing at least a portion of the organic waste to be anaerobically digested by microorganisms naturally occurring in the organic waste;
   removing at least a portion of the liquid fraction and mixing it with aerobic microorganisms and an aerating gas while maintaining the temperature of the resulting aerobic mixture within a temperature range in which the aerobic microorganisms can aerobically digest organic waste in the aerobic mixture and allowing at least a portion of the organic waste in the aerobic mixture to aerobically digested by the aerobic microorganisms to form a liquor comprising water and aerobic microorganisms;
   subjecting the liquor to microzone treatment to remove at least a portion of the aerobic microorganism from the liquor to form a permeate; and
   discharging the permeate.

14. The method of claim 13 and further comprising allowing suspended solid matter in the liquor to settle prior to subjecting the liquor to microzone treatment.

15. The method of claim 13 and further comprising adding anaerobic microorganisms to the waste material to obtain a concentration of the microorganisms in the range of from about 1 wt % to about 25 wt % of the waste material.

16. The method of claim 13 and further comprising collecting gas produced by the anaerobic digestion.

17. The method of claim 13 wherein the algae comprise green algae of the genus Chlorella.

18. The method of claim 13 wherein the amount of the organisms added to the liquid fraction is within the range of from about 30 mg/l to about 200 mg/l.

19. The method of claim 13 wherein the aerobic mixture comprises greater than about 20% by volume aerobic microorganisms.

20. The method of claim 13 wherein the aerobic mixture comprises greater than about 20% by volume aerobic microorganisms.

21. The method of claim 13 wherein the aerating gas is air.

22. The method of claim 13 wherein the aerating gas comprises a volume fraction of oxygen greater than the volume fraction of oxygen in ambient air.

23. The method of claim 13 wherein the temperature of the aerobic mixture can be maintained by controlling the temperature of the aerating gas.

24. The method of claim 13 wherein the aerating gas is introduced into the aerobic mixture by sparging or by fill/draw mixed media batch reactor.

25. The method of claim 13 wherein the organic waste is anaerobically digested for less than about 3 days.

26. The method of claim 13 wherein the liquor is subjected to microzone treatment for less than about 7 days.

27. The method as claimed in claim 13 wherein the suspended solid matter in the liquor is allowed to settle for less than about 20 hours.

* * * * *